United States Patent Office
2,809,936
Patented Oct. 15, 1957

2,809,936

OLEIC ACID ESTERS OF ARYLOXY ALCOHOLS AND LUBRICANT COMPOSITIONS CONTAINING THE SAME

Richard J. Neely, Acmetonia, and Albert G. Rocchini, Springdale, Pa., assignors to Gulf Research & Development Company, Pittsburgh, Pa., a corporation of Delaware No Drawing. Application December 31, 1952, Serial No. 329,128

4 Claims. (Cl. 252—57)

This invention relates to esters of oleic acid which are valuable for use as lubricants and as plasticizers and as intermediates for the preparation of other organic compounds. The invention also relates to lubricant compositions and to a process of lubricating frictionally engaged surfaces.

The esters of the invention are esters of oleic acid with phenoxy aliphatic alcohols, the alkylene groups of which contain 2 to 6 carbon atoms. The phenoxy substituent in alcohols of this class can itself contain substituents which do not make the resulting oleic acid ester insoluble in oil. Examples of suitable substituents which may be present in the benzene nucleus of the phenoxy radical are alkyl radicals such as methyl, ethyl, propyl, n-butyl, isobutyl, and diisobutyl radicals and the like; cycloalkyl radicals such as cyclopentyl, cyclohexyl, methyl cyclohexyl, and dicyclohexyl radicals and the like; alkoxy radicals having alkyl groups such as the class of alkyl radicals referred to above; aryl radicals such as phenyl, tolyl, naphthyl radicals and the like; and halogen atoms, particularly in cases where the ester is to be employed as a component of an extreme pressure lubricant. The esters are useful as lubricants and as components of lubricants in admixture with mineral oils or with other synthetic lubricants. They are miscible in mineral oils. The esters and lubricating oil compositions containing the esters are characterized by high viscosity indexes and low pour points.

Preferred esters of this class may be represented by the following general formula:

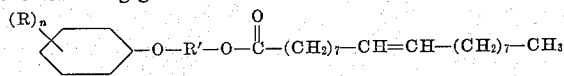

Wherein R represents hydrogen or a substituent selected from the group consisting of alkyl, cycloalkyl, alkoxy, and aryl radicals, R' represents an alkylene radical containing 2 to 6 carbon atoms, and $n$ represents an integer not greater than 2.

The especially preferred esters of this class are esters in which R is hydrogen, secondary butyl or tertiary butyl, and $n$ is 1. The alkyl radicals in these especially prefered esters are desirably in the para position with respect to the linking oxygen atom.

The esters of our invention can be prepared by heating a mixture of oleic acid and an aryloxy alcohol of the class indicated, preferably in the presence of a suitable esterification catalyst such as para-toluene sulfonic acid or sulfuric acid. The reactants are employed in substantially equi-molecular amounts, preferably with a slight excess of the alcohol. If desired, an organic solvent such as benzene or toluene can be added to the reaction mixture to aid in distilling water from the reaction mixture. Upon completion of the reaction, the mixture is treated with sufficient alkali to neutralize the acid catalyst and the organic solvent is removed in any suitable manner, for example by distillation. The crude reaction product can then be employed as a lubricant or as a component of a lubricant mixture, or if desired the crude product can be purified by fractional distillation or low temperature crystallization to produce substantially pure esters for use as lubricants or components of lubricants.

The following examples illustrate suitable methods of preparing the esters of our invention.

*Example I*

A mixture of 325 grams of 1-phenoxy-2-propanol, 564 grams of oleic acid, 5 grams of para-toluene sulfonic acid catalyst and 200 cc. of toluene was refluxed for 4 hours at 111° C. The reaction was considered complete when no more water could be distilled from the reaction mixture. The reaction mixture was neutralized with anhydrous sodium carbonate, stirred for ½ hour at room temperature and filtered. 20 grams of alumina were then added and the mixture was stirred for 1 hour at 45° C. and filtered. Toluene was stripped from the reaction product by atmospheric distillation. The reaction product after removal of toluene was found to have a viscosity index of 124, a pour point of −25° F. and a gravity of 16.8° A. P. I. The reaction product contained the ester 1-phenoxy-2-propyl oleate having the following formula:

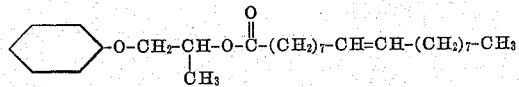

*Example II*

A mixture of 282 grams of oleic acid, 320 grams of 2-(4-sec-butylphenoxy) ethanol, 5 grams of para-toluene sulfonic acid catalyst, and 200 cc. of toluene was refluxed for 4 hours at 111° C. until no more water could be distilled from the reaction mixture. The reaction product was neutralized and separated from toluene as in Example I. The reaction product after separation of toluene was found to have a viscosity index of 113, a pour point of −10° F., a gravity of 13.6° A. P. I. and a viscosity at 100° F. of 138 S. U. S. The reaction product contained the ester 2-(4-sec-butylphenoxy) ethyl oleate having the following formula:

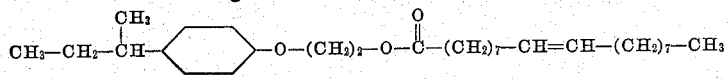

*Example III*

A mixture of 282 grams of oleic acid, 220 grams of 2-(4-tert-butylphenoxy) ethanol, 5 grams of para-toluenesulfonic acid catalyst and 200 cc. of toluene was refluxed for 3 hours at 111° C. until no more water could be distilled from the mixture. The reaction product was neutralized and separated from toluene as in Example I. The reaction product after removal of toluene was found to have a viscosity index of 157, a pour point of −50° F., and a gravity of 16.6° A. P. I. The reaction product contained the ester 2-(4-tert-butylphenoxy) ethyl oleate having the following formula:

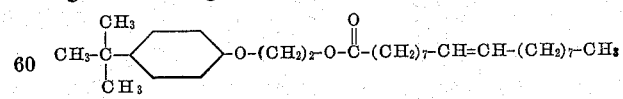

The esters of the present invention are excellent lubricants either in the crude form as obtained in the examples above or in a purified form. Because of the high viscosity indexes and low pour points of the esters, they are particularly useful for lubricating frictionally engaged surfaces under conditions of widely varying temperatures and at low temperatures at which lubricants of higher pour points would be unsuitable.

As we have indicated, the esters are also useful in either the crude or purified form as components of lubricant mixtures. The esters confer on lubricant mixtures the characteristics of high viscosity indexes and low pour points. The mixtures also have other desirable properties for lubricants such as good coefficients of friction. They are employed in mixtures with mineral oils in any desired proportions but in amount sufficient to produce a lubricant composition having a viscosity index or pour point superior to the viscosity index or pour point of the mineral oil. Mixtures containing from about 10 to 70 weight percent of the ester are preferred, although much smaller amounts, e. g. 1% or less, of the ester may also have beneficial effects and greater amounts up to 100% can of course be used if desired since the esters themselves are excellent lubricants. We have prepared mixtures of our esters with mineral lubricating oil. In Table I below are recorded for comparison the viscosity index, pour point, and gravity data for a mineral oil with which we have mixed esters of our invention and for mixtures of the mineral oil and esters of our invention in equal parts by weight. In Table I the designation, ester #1, refers to the crude 1-phenoxy-2-propyl oleate prepared in accordance with Example I; ester #2 refers to the crude 2-(4-sec-butylphenoxy) ethyl oleate prepared in accordance with Example II; and ester #3 refers to the crude 2-(4-tert-butylphenoxy) ethyl oleate prepared in accordance with Example III. The mineral oil used in the mixtures was a paraffinic lubricating oil having a gravity of 27.6° A. P. I., a viscosity at 100° F. of 102.2 S. U. S., and a viscosity at 210° F. of 38.8 S. U. S.

TABLE I

|  | Viscosity Index | Pour Point, ° F. | Gravity, ° A. P. I. |
|---|---|---|---|
| Mineral Oil | 69 | +20 | 27.6 |
| Mineral Oil and Ester #1 | 92 | −5 | 22.1 |
| Mineral Oil and Ester #2 | 82 | −5 | 20.1 |
| Mineral Oil and Ester #3 | 108 | −5 | 21.5 |

From the results of Table I it can be seen that the use of esters of our invention made possible the production from a mineral oil of poor quality with respect to viscosity index and pour point, three lubricant compositions of excellent viscosity indexes and pour points.

Obviously many modifications and variations of the invention as hereinbefore set forth may be made without departing from the spirit and scope thereof and therefore only such limitations should be imposed as are indicated in the appended claims.

We claim:

1. A lubricant composition comprising a mineral lubricating oil and the ester 1-phenoxy-2-propyl oleate, the amount of said ester being sufficient to produce a lubricant composition having a viscosity index superior to the viscosity index of said mineral oil.

2. A lubricant composition comprising a mineral lubricating oil and the ester 2-(4-sec-butylphenoxy) ethyl oleate, the amount of said ester being sufficient to produce a lubricant composition having a viscosity index superior to the viscosity index of said mineral oil.

3. A lubricant composition comprising a mineral lubricating oil and the ester 2-(4-tert-butylphenoxy) ethyl oleate, the amount of said ester being sufficient to produce a lubricant composition having a viscosity index superior to the viscosity index of said mineral oil.

4. A lubricant composition comprising a mineral lubricating oil and an oil-soluble ester of oleic acid with a phenoxy substituted aliphatic alcohol having an alkylene radical of from 2 to 3 carbon atoms, the phenoxy substituent of said alcohol being selected from the group consisting of the unsubstituted phenoxy radical and phenoxy radicals having one substituent, said substituent being an alkyl radical having not more than 4 carbon atoms, and the amount of said ester being sufficient to produce a lubricant composition having a viscosity index superior to the viscosity index of said mineral oil.

References Cited in the file of this patent

UNITED STATES PATENTS

| 2,010,560 | North | Aug. 6, 1935 |
| 2,446,045 | De Groote | July 27, 1948 |
| 2,534,611 | Martin | Dec. 19, 1950 |